United States Patent [19]

Hirsch et al.

[11] 4,425,862
[45] Jan. 17, 1984

[54] SAIL LINE STOPPER

[76] Inventors: Jacob Hirsch, 420 North St., Harrison, N.Y. 10528; A. Allen Lipton, Rock Ridge, Mamaroneck, N.Y. 10543

[21] Appl. No.: 406,207

[22] Filed: Aug. 9, 1982

[51] Int. Cl.³ .............................................. B63B 21/04
[52] U.S. Cl. ................... 114/199; 24/134 R; D8/356; 254/252
[58] Field of Search .............. 114/199, 200, 218, 109, 114/111; 254/252, 257, 391; 242/107.2; 188/65.1, 67, 72.9; 24/134 R, 134 KB; D8/356

[56] References Cited

U.S. PATENT DOCUMENTS

| 15,279 | 7/1856 | Boynton | 24/134 R |
|---|---|---|---|
| 152,270 | 6/1874 | Bird | 24/134 R |
| 253,058 | 1/1882 | Hutchins | 24/134 R |
| 430,922 | 6/1890 | Chassagne | 24/134 R |
| 842,329 | 1/1907 | McClean | 24/134 R |
| 1,410,162 | 3/1922 | Cadwell | 24/134 R |
| 1,413,616 | 4/1922 | Rock | 24/134 R |
| 3,051,116 | 8/1962 | Weil | 24/134 R |

FOREIGN PATENT DOCUMENTS 6044 of 1895 United Kingdom ................ 114/199

*Primary Examiner*—Trygve M. Blix
*Assistant Examiner*—Patrick W. Young

[57] ABSTRACT

A sail line stopper is provided for controlling the hoisting and trimming of sails in which the line may be released under heavy load without abrading the line so released. A U-shaped base member having legs with a pivot pin mounted therein is adapted to be anchored on a sailboat. A cam mechanism includes an inner element having a handle attached thereto which is eccentrically mounted for pivotal movement around the pivot pin. A movable outer element is positioned for pivotal movement and a rotational movement on the eccentrically mounted inner element. One or more springs are mounted between the inner and outer elements of the cam mechanism which are acted on when relative movement takes place between the elements. The spring is compressed when the handle is pivoted placing the outer member in locking engagement with the line in the load direction which locking action is increased with increasing load; while allowing the outer member to rotate or float over the line in the other direction. Each release of the load direction is effected by raising the handle. The line stopper can be released under heavy load because the outer element holding the line rotates in the same direction the line is running, the line will not be abraded thereby limiting line wear. The line stopper may be mounted either vertically or horizontally.

4 Claims, 6 Drawing Figures

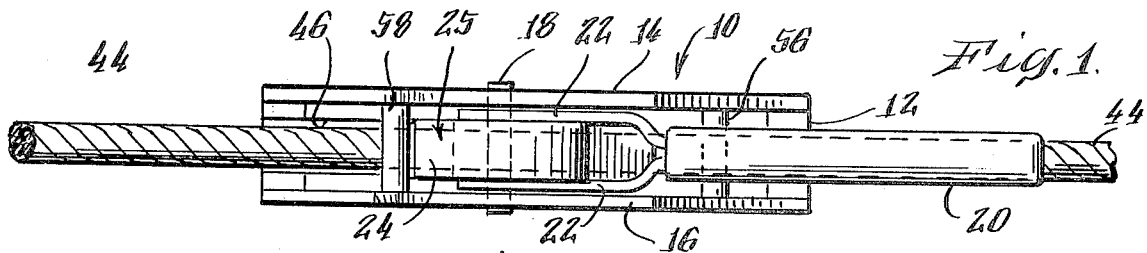
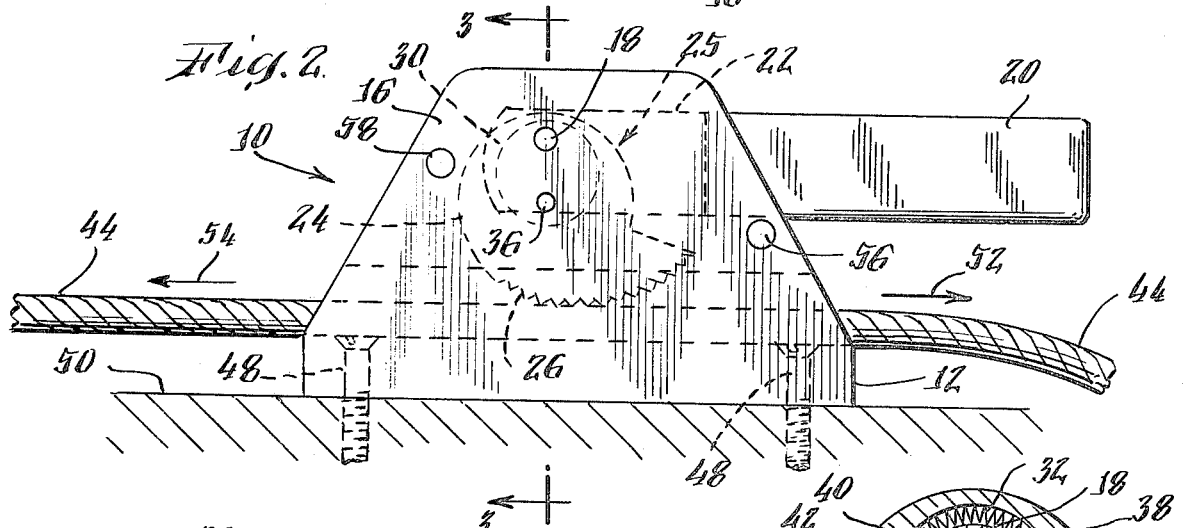
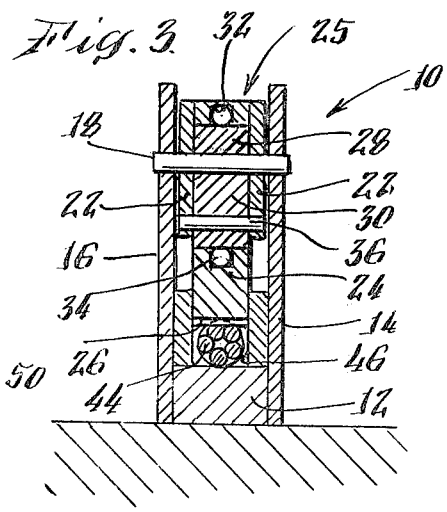
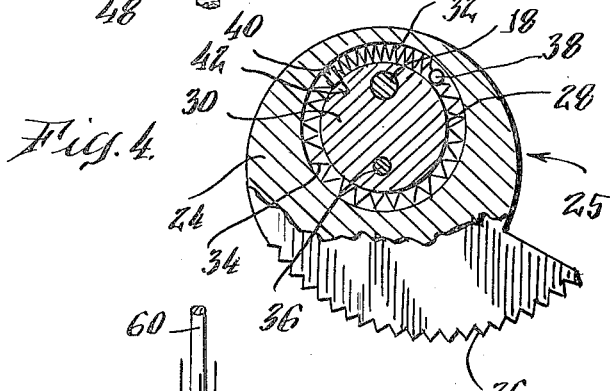
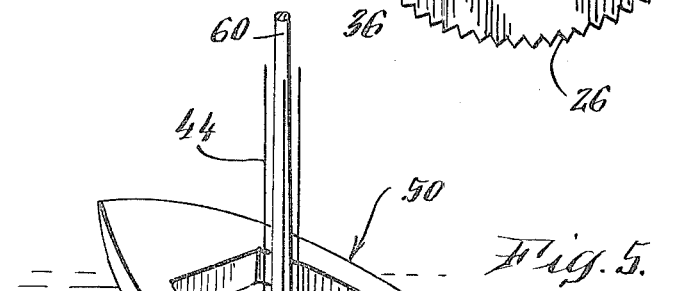
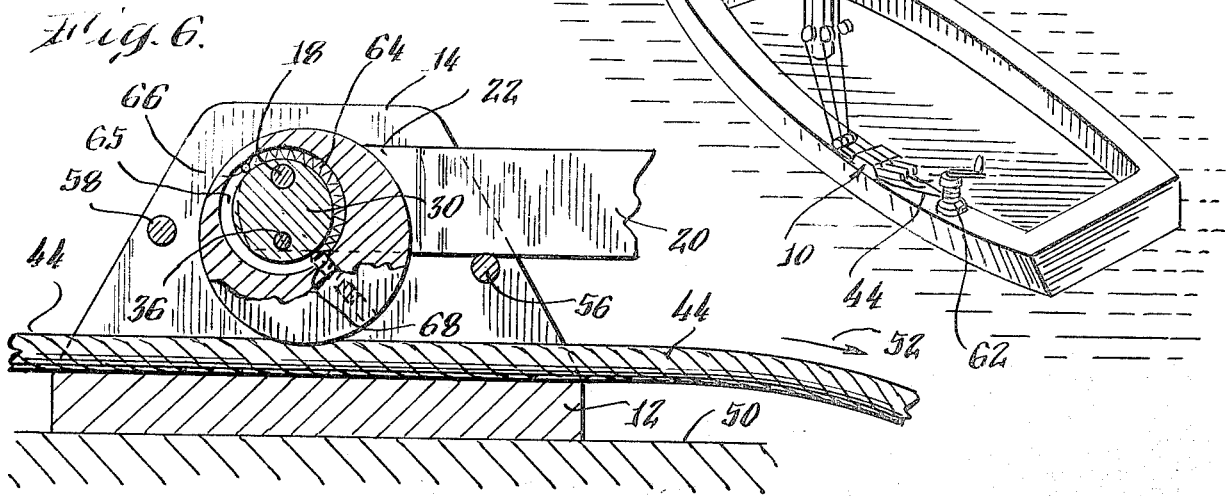

SAIL LINE STOPPER

BACKGROUND OF THE INVENTION

This invention relates to a sail line stopper for controlling sails, and more particularly to such a line stopper which can be released under high load and upon release the cam holding element of the line stopper rotates or floats in a direction that the line is running to prevent abrasion.

On sailing vessels, lines are used to raise and control sails and other operating units often under heavy loads. The same line may first be lightly loaded, and then as the tension required increases, the use of a winch is necessary. To allow one winch to be used for several lines, of the same or varying sizes, a sheet or line stopper is provided for each line. When out of engagement, the line stopper permits the line to run in both directions. In an engaged position, the line runs under light pressure in one direction only. It is therefore possible to haul a line in by hand without slipping as a self-locking action prevents line movement of the line in the opposite direction. As the load increases, a winch is used to set the line in the desired position as control becomes difficult by hand. With the line stoppers presently available, although the line may be taken off the winch and still be held by the line stopper, it is impossible to release the line without the use of a winch to hold the load while the line stopper is released. In sailboat racing, putting a line on a winch in order to effect a release of the line stopper is time consuming as well as tying up a winch which may be necessary for another control function. Also, the line stopper tends to contact and abrade a line on its release under load even using a winch to help effect such a release.

SUMMARY OF THE INVENTION

Accordingly, it is an object of this invention to provide a new and improved sail line stopper which may be utilized in sail boat racing to save time in controlling sails.

A further object of this invention is to provide a new and improved sail line stopper which eliminates the need for a winch for each line attached to a sail and permits a single or lesser number of winches to be utilized for a plurality of lines.

Still a further object of this invention is to provide a new and improved sail line stopper which may be quickly released under high load and does not require a winch to do so.

A still further object of the present invention is to provide a new and improved sail line stopper in which the holding mechanism upon release revolves in the same direction that the line being held is running for preventing abrasion of the line on release thereby limiting the wear on expensive sail line.

Yet another object of the present invention is to provide a new and improved sheet or halyard stopper for controlling a line on a sailboat which is sturdy, easy to handle and operate, is simple in construction and reduces the requirement for winches whereby several line stoppers may be employed using a single winch.

In carrying out this invention in one illustrative embodiment thereof, a sail line stopper is provided for controlling a line of a sailboat having a U-shaped base member with a pivot pin attached to the legs thereof and the base being adapted to be anchored on the sailboat. A cam mechanism includes an inner element having a handle which is eccentrically mounted for pivotal movement around the pivot pin in the base. An outer element is positioned for pivotal movement with, and rotational movement on, the inner element. Spring means are mounted between the inner and outer elements of said cam mechanism which are activated when relative movement occurs between said elements. The line is inserted between the outer element and the base. When the handle is moved toward the line the outer member is pivoted on said inner element into locking engagement with the line, and the spring means is compressed. The line may be released under full load simply by raising the handle which moves the self locking cam mechanism to release the holding pressure on the line permitting the outer element to rotate so that its outer surface moves in the same direction as the released line thereby preventing abrasion of the line. By running the line from the sail through the sail line stopper onto a winch, the mechanical advantage of the winch may be achieved, the sail trimmed and removed from the winch at which time it is held by the line stopper until released. This frees the winch for use with other lines.

BRIEF DESCRIPTION OF THE DRAWINGS

This invention, together with further aspects, features, objects and advantages thereof will be more clearly understood by considering the following description in conjunction with the accompanying drawings in which like elements bear the same reference numerals throughout the several views.

FIG. 1 is a top view of the sail line stopper embodying the present invention.

FIG. 2 is a side elevation of the sail line stopper shown in FIG. 1 with a line inserted therein, and the handle shown in a line stopping position.

FIG. 3 is a cross-sectional view taken along line 3—3 of FIG. 2.

FIG. 4 is an enlarged view, which is partially broken away and in section, illustrating the cam mechanism of the sail line stopper.

FIG. 5 illustrates the sail line stopper of the present invention mounted in a sailboat in which it is adapted to be used.

FIG. 6 is another embodiment of the sail line stopper illustrated in FIG. 2, with a portion of the operating mechanism broken away and in section, illustrating an alternate cam mechanism for performing the line stopping function.

DESCRIPTION OF THE PREFERRED EMBODIMENTS

Referring now to FIGS. 1-3, the sail line stopper of the present invention is referred to generally with the reference numeral 10, and includes a U-shaped base 12 having upstanding, parallel legs 14 and 16 with a pivot shaft 18 extending therebetween on which a handle 20 is pivotally mounted by split tongues 22. The line stopper base 12 has an interior surface which is stationary and flat or slightly concave having teeth thereon to hold the line in conjunction with an eccentric locking cam mechanism 25 to be described.

As will best be seen in FIGS. 2 through 4, the cam mechanism, referred to generally with the reference numeral 25, includes an outer member 24 having a toothed cam surface 26 thereon and a peripheral groove 28 located centrally around the periphery thereof in which is positioned a compression spring 32 and a compression spring 34. The outer member 24 is mounted on an inner member 30 with the spring means 32 and 34 positioned therebetween. The inner member 30 is secured for rotation about the pivot shaft 18 to the tongues 22 of the handle 20 by a pin 36. The outer member 24 however, is positioned for pivotal movement with and rotational movement on the inner element 30. As will be seen in FIG. 4, a stop 38 and a pin 40 which extends from the inner member 30 into a groove 42 of the outer element 24 separates the compression springs 32 and 34.

As is illustrated in FIG. 1, a line 44 is placed or threaded through a channel 46 formed by the legs 14 and 16 at the lower end thereof with the base 12. The base 12 may be secured to a boat 50 on which it is mounted by bolts 48. The line 44 is threaded through or inserted in the channel 46 in the direction illustrated by the arrow 52. The line 44 may be removed from the line stopper 10 by moving the line in the direction illustrated by the arrow 54 when the handle 20 is raised.

In operation the basic locking element of the line stopper 10 is the eccentric cam 25 which has a self energizing locking action. The outer member 24 of the cam 25 rotates around the inner element 30 which is in turn mounted within the operating handle 20. The inner element 30 has an off center pivot 18 mounted in the legs 14 and 16 on which it rotates. When the handle 20 is moved from open to a closed position as shown in FIG. 1, the outer member of eccentric cam 25 is brought into firm contact with the line 44 to be controlled. The eccentric cam 25 has a neutral position, controlled by two separate and distinct spring actions, which may be generated by two compression springs, 34 and 32 (as shown in FIG. 4) internally mounted between the inner member 30 and the eccentric locking member 24. One spring action takes place when the handle 20 is activated to lock position, allowing the eccentric locking member 24 to rotate from a neutral position to accommodate various sizes of line, and in so doing, develop a spring pressure that forces the eccentric locking outer member 24 to rotate, pressing the holding teeth 26 onto the line 44. The line then can be moved in one direction as indicated by the arrow 52 easily, but movement in the opposite direction as indicated by the arrow 54 results in the eccentric outer member locking firmly with the locking action increasing with the load.

The second spring action is one which takes place when the handle is moved toward an open position thereby elevated from the position shown in FIG. 2. This movement of the handle rotates the inner member 30 upon its off center pivot 18 in a counterclockwise direction and moving the eccentric locking cam outer member 24 away from the line thereby permitting it to start moving clockwise in the release direction under light spring pressure in conjunction with the released line. The line therefore can be released easily, even when under heavy load. The cam teeth 26 do not abrade the line 44 as they are moving in the same direction as the released line. The second spring action the returns the eccentric locking cam 25 to its neutral position. A stop 56 is provided to limit the downward movement of the handle 20 to prevent excessive digging into the line 44. A strengthening shaft 58 is also positioned in front of the cam mechanism 25 to strengthen the legs 14 and 16 of base 12.

As will be seen in FIG. 5, a plurality of line stoppers are shown attached to a sailboat 50 for controlling a plurality of lines running down a mast 60. It will be understood that other lines from different positions may be used. The free end of the sheet or line 44 may be attached to a winch 62 which may be used to overcome the force of gravity or the wind in raising or setting a sail. When the sail is hoisted or set, the end of the sheet or line 44 may be removed from the winch 62 where it will be held in place by the line stopper 10 and free the winch for use on another sheet, line or halyard.

FIG. 6 illustrates another embodiment which utilizes a single spring in the form of a combination tension and compression spring 64 positioned in the groove 65 attached to pin or stop 66 mounted in the inner element 30 on one end of the spring 64 and a set screw 68 mounted in the outer member which extends therefrom into the groove 65 in the inner member 30 to engage the other end of the spring 68 in the groove 65. As the handle 20 is pivoted downwardly, the set screw 68 compresses the spring 64 on the pin 66 which provides a floating action of the outer cam member 24 of the cam mechanism 25. When the handle 20 is elevated the spring 64 is stretched as the cam rotates with the running line until free of the line, when the spring retracts and returns it to a neutral position. This alternating compression and tension actually tends to maintain the spring in its original shape thereby prolonging its life. It will be noted that in the embodiment of FIG. 6, the outer member has a circular configuration which may be roughened up on the exterior surface for gripping the line 44 as contrasted with the toothed cam surface 26 of the embodiment illustrated in FIG. 2.

Among the many advantages of the invention are the fact that a single winch on a boat may be utilized with a plurality of line stoppers in accordance with the present invention for serving a plurality of lines and performing the functions which are required, namely, setting sails, adjusting the positioning of the sail, hoisting the sail, changing the sail, etc. The winch is not tied up in use in releasing the line stopper. The line may be released from the line stopper under heavy load simply by lifting the handle. In addition, when affecting the release the cam mechanism of the present invention moves in a direction in which the line is running so that the line is not excessively abraded or worn during the line releasing function. Also the line stopper may be mounted horizontally or vertically. The line stopper in accordance with the present invention not only reduces the number of winches required, but saves precious seconds in adjusting sails on a sailboat to accommodate varying wind conditions providing a particular advantage for those engaged in the sport of racing sailboats.

Since other changes and modifications varied to fit particular operating requirements and environments will be apparent to those skilled in the art, the invention is not considered limited to the examples chosen for purposes of illustration, and includes all changes and modifications which do not constitute a departure from the true spirit and scope of this invention as claimed in the following claims and equivalents thereto.

What is claimed is:

1. A sail line stopper adapted to control a line on a sailboat which line can be released under heavy load without abrading the line comprising:
   a U-shaped base member having a pivot pin member in the legs of said U-shaped base, said base adapted to be anchored on a sailboat, an inner element having a handle attached thereto eccentrically mounted for pivotal movement around said pivot pin, a moveable outer element positioned for pivotal movement with and rotational movement on said inner element, spring means mounted between said inner element and said outer element which is acted on by relative movement between said inner and outer elements, said line adapted to be inserted between said outer element and said base with the rotary movement of said outer element accommodating various size of line, said spring means being placed in compression when said outer element is pivoted into engagement with the line when said handle is activated toward said line thereby locking said outer element to said line which locking increases as the load increases on said line while allowing said outer member to easily ride over said line in the opposite direction away from the load, said line being released in said opposite direction when said handle is raised thereby pivoting said outer element away from said line permitting the line to move in the release direction with the outer element moving in the same direction under light spring pressure whereby said line is released easily even under heavy load condition without abrasion as said outer element is permitted to move in the same direction as the released line.

2. The line stopper set forth in claim 1, said base having a channel therein established between said base and said outer member for receiving said line, the height of said channel being variable by the eccentric mounting of said outer member pivoting on said inner member for accommodating various size lines.

3. The line stopper set forth in claims 1 or 2 wherein said spring means is positioned in a groove in said outer element, a pin from said inner element extending into said groove in said outer element cooperating with a spaced pin in said outer element for compressing said spring on actuating said handle toward said line in said base.

4. The line stopper set forth in claims 1 or 2 wherein said sring means is positioned in a groove in said inner element and a pin is provided in said inner element restricting the movement of said spring means on one portion thereto and a set screw is provided in said outer element which extends into the spring in said groove of said inner element thereby restricting the movement of said spring means between said pin and said set screw.

* * * * *